(12) United States Patent
Rosal et al.

(10) Patent No.: US 11,059,125 B2
(45) Date of Patent: Jul. 13, 2021

(54) FRICTION STIR PROCESSING TOOL WITH RADIAL PROTRUSION

(71) Applicant: Mazak Corporation, Florence, KY (US)

(72) Inventors: David Rosal, West Bountiful, UT (US);
Scott M. Packer, Alpine, UT (US);
Rodney Dale Fleck, Draper, UT (US);
Russell J. Steel, Salem, UT (US)

(73) Assignee: Mazak Corporation, Florence, KY (US)

( * ) Notice: Subject to any disclaimer, the term of this patent is extended or adjusted under 35 U.S.C. 154(b) by 0 days.

(21) Appl. No.: 16/189,022

(22) Filed: Nov. 13, 2018

(65) Prior Publication Data
US 2019/0151982 A1    May 23, 2019

Related U.S. Application Data

(60) Provisional application No. 62/589,020, filed on Nov. 21, 2017.

(51) Int. Cl.
*B23K 20/12* (2006.01)

(52) U.S. Cl.
CPC ................ *B23K 20/1255* (2013.01)

(58) Field of Classification Search
CPC ............ B23K 20/1255; B23K 20/1275; B23K 20/227; B23K 2101/18; B23K 2103/02
See application file for complete search history.

(56) References Cited

U.S. PATENT DOCUMENTS

| | | | |
|---|---|---|---|
| 4,534,690 A | * | 8/1985 | Barth ................ B21K 1/56 411/386 |
| 5,096,352 A | * | 3/1992 | Lemelson ............ B24D 18/00 411/424 |
| 6,648,206 B2 | | 11/2003 | Nelson |
| 6,732,901 B2 | | 5/2004 | Nelson |
| 6,779,704 B2 | | 8/2004 | Nelson |
| 7,124,929 B2 | | 10/2006 | Nelson |
| 7,152,776 B2 | | 12/2006 | Nelson |
| 7,225,968 B2 | | 6/2007 | Packer |
| 11,821,790 | | 6/2007 | Packer |

(Continued)

FOREIGN PATENT DOCUMENTS

| | | |
|---|---|---|
| DE | 202005021318 | 8/2007 |
| GB | 2306366 | 5/1997 |
| JP | 2001071155 | 3/2001 |

OTHER PUBLICATIONS

Praxair Surface Technolgies (Tungsten Carbide Coatings for Feedscrews, https://www.praxairsurfacetechnologies.com/-/media/corporate/praxairsurface/us/documents/brochures/tungsten-carbide-coatings-for-feed-screws.pdf?la=en&rev=350d12049da3446c968174712b3db77a, Jan. 2011) (Year: 2011).*

(Continued)

*Primary Examiner* — Erin B Saad
(74) *Attorney, Agent, or Firm* — Fitch, Even, Tabin & Flannery LLP

(57) ABSTRACT

A friction stir processing (FSP) tool includes a pin having a pin body and a rotational axis. The pin is configured to rotate about the rotational axis in a rotational direction. The pin has a radial protrusion protruding radially from the pin body, and the radial protrusion has a working surface oriented in the rotational direction with a depth in a radial direction relative to the rotational axis.

15 Claims, 11 Drawing Sheets

(56) References Cited

U.S. PATENT DOCUMENTS

| | | | |
|---|---|---|---|
| 7,270,257 B2 | 9/2007 | Steel | |
| 7,275,675 B1 * | 10/2007 | Carter | B23K 20/1255 |
| | | | 228/112.1 |
| 7,494,040 B2 | 2/2009 | Babb | |
| 7,530,486 B2 | 5/2009 | Flak | |
| 7,608,296 B2 | 10/2009 | Packer | |
| 7,651,018 B2 | 1/2010 | Packer | |
| 7,661,572 B2 | 2/2010 | Nelson | |
| 7,753,252 B2 | 7/2010 | Taylor | |
| 7,845,545 B2 | 12/2010 | Packer | |
| 7,909,231 B2 | 3/2011 | Babb | |
| 7,992,759 B2 | 8/2011 | Steel | |
| 7,993,575 B2 | 8/2011 | Nelson | |
| 8,056,797 B2 | 11/2011 | Packer | |
| 8,157,154 B2 | 4/2012 | Packer | |
| 8,186,561 B2 | 5/2012 | Allen | |
| 8,241,556 B2 | 8/2012 | Rosal | |
| 8,302,834 B2 | 11/2012 | Nelson | |
| 8,317,080 B2 | 11/2012 | Kingston | |
| 8,469,256 B2 | 6/2013 | Babb | |
| 8,490,855 B2 | 7/2013 | Kingston | |
| 8,550,326 B2 | 10/2013 | Packer | |
| 8,910,851 B2 | 12/2014 | Rosal | |
| 8,955,734 B2 | 2/2015 | Steel | |
| 9,061,370 B2 | 6/2015 | Nelson | |
| 9,061,371 B2 | 6/2015 | Higgins | |
| 9,242,308 B2 | 1/2016 | Peterson | |
| 9,352,425 B2 | 5/2016 | Rosal | |
| 9,764,375 B2 | 9/2017 | Miles | |
| 2002/0011509 A1 * | 1/2002 | Nelson | B23K 20/129 |
| | | | 228/112.1 |
| 2003/0075584 A1 | 4/2003 | Sarik | |
| 2004/0035914 A1 | 2/2004 | Hempstead | |
| 2005/0006439 A1 | 1/2005 | Packer | |
| 2005/0051602 A1 | 3/2005 | Babb | |
| 2005/0142005 A1 | 6/2005 | Traylor | |
| 2006/0032333 A1 | 2/2006 | Steel | |
| 2006/0032891 A1 | 2/2006 | Flak | |
| 2006/0049234 A1 | 3/2006 | Flak | |
| 2006/0157531 A1 | 7/2006 | Packer | |
| 2006/0175382 A1 | 8/2006 | Packer | |
| 2007/0187465 A1 | 8/2007 | Eyre | |
| 2008/0029578 A1 | 2/2008 | Steel | |
| 2008/0217377 A1 * | 9/2008 | Stol | B23K 20/1255 |
| | | | 228/2.3 |
| 2009/0294514 A1 | 12/2009 | Babb | |
| 2010/0071961 A1 | 3/2010 | Steel | |
| 2010/0078224 A1 | 4/2010 | Steel | |
| 2011/0101071 A1 * | 5/2011 | Kato | B23K 20/1265 |
| | | | 228/2.1 |
| 2011/0127311 A1 | 6/2011 | Peterson | |
| 2011/0172802 A1 | 7/2011 | Babb | |
| 2012/0055977 A1 | 3/2012 | Steel | |
| 2012/0227546 A1 | 9/2012 | Allen | |
| 2012/0273555 A1 | 11/2012 | Flak | |
| 2013/0062395 A1 | 3/2013 | Nelson | |
| 2013/0206818 A1 | 8/2013 | Higgins | |
| 2013/0228612 A1 | 9/2013 | Higgins | |
| 2013/0299561 A1 | 11/2013 | Higgins | |
| 2014/0008418 A1 | 1/2014 | Steel | |
| 2014/0151438 A1 | 6/2014 | Fleck | |
| 2015/0258628 A1 | 9/2015 | Flak | |
| 2016/0354861 A1 * | 12/2016 | Xu | B23K 20/1275 |
| 2017/0197274 A1 | 7/2017 | Steel | |
| 2017/0216961 A1 | 8/2017 | Utter | |
| 2018/0099349 A1 | 4/2018 | Packer | |
| 2019/0061046 A1 | 2/2019 | Fleck | |
| 2019/0061048 A1 | 2/2019 | Fleck | |

OTHER PUBLICATIONS

U.S. Appl. No. 12/392,030, filed Feb. 24, 2009, Babb.
U.S. Appl. No. 16/401,907, filed May 5, 2019, Liu.
U.S. Appl. No. 16/407,353, filed May 9, 2019, Miles.
Extended European Search Report, issued in corresponding European Application No. 18205523.6, dated May 3, 2019, 9 pages.
U.S. Appl. No. 60/573,703, filed May 24, 2014, 6 pages.

\* cited by examiner

FRICTION STIR PROCESSING TOOL WITH RADIAL PROTRUSION

CROSS-REFERENCE TO RELATED APPLICATIONS

This application claims priority to and the benefit of U.S. Provisional Patent Application No. 62/589,020, filed on Nov. 21, 2017, which is hereby incorporated by reference in its entirety.

BACKGROUND

Friction stir processing ("FSP") of metals has been used to attach weldable materials to one another in a solid state joining process. FSP uses the motion of a pin pressed against the surface of a weldable material to generate heat and friction to move the weldable material. The material can plasticize and physically stir together with a second material to which the first material is joined. A pin, a pin and shoulder, or another "FSP tool" may be rotated in contact with a workpiece. A force is applied to the FSP tip to urge the FSP tool against the workpiece. The FSP tool is moved along the workpiece to stir the material of the workpiece. The physical process of mixing material from two plates joins the plates.

FSP joins weldable materials in a solid-state process that avoids many of the potential defects of other welding processes. For example, FSP produces a stirred region along the path of the tool that is generally indistinguishable from the original material. FSP may be performed without the inclusion of an additional material or use of shield gasses. Some welding methods, such as metal-inert gas ("MIG") welding, may introduce an additional material to create a bond. Other welding methods, such as tungsten-inert gas ("TIG") welding, may use a non-consumable contact point to heat one or more workpieces. However, the heating may cause the one or more workpieces to attain a liquid phase and risk a phase change in the one or more workpieces. A phase change may compromise the integrity of the bond and, potentially, the workpiece, itself. To limit the possibility of a phase change or other reaction, TIG welding and similar processes utilize an inert gas "shield" around the contact area.

FSP may, therefore, provide more controllable bonds in various applications. The predictability of FSP may be desirable during the manufacturing and/or assembly of structures or devices that experience high forces during use in environments or applications in which the structure or device may be inaccessible by operators.

SUMMARY

In some embodiments, a friction stir processing (FSP) tool includes a pin having a pin body and a rotational axis. The pin is configured to rotate about the rotational axis in a rotational direction. The pin has a radial protrusion protruding radially from the pin body, and the radial protrusion has a working surface oriented in the rotational direction with a depth in a radial direction relative to the rotational axis.

In some embodiments, a method of friction stir processing includes rotating a pin of a FSP tool in contact with a workpiece including a workpiece material, softening the workpiece material, and flowing softened workpiece material with a working surface of a radial protrusion of the pin.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure. Understanding that the drawings depict some example embodiments, the embodiments will be described and explained with additional specificity and detail through the use of the accompanying drawings in which:

FIG. 11-1 is a bottom perspective view of still another pin of a FSP tool, according to some embodiments of the present disclosure;

FIG. 11-2 is a bottom perspective view of a still further pin of a FSP tool, according to some embodiments of the present disclosure;

DETAILED DESCRIPTION

This disclosure generally relates to devices, systems, and methods for friction stir processing (FSP) for friction stir welding, joining, processing, or other friction stirring procedures. More specifically, embodiments of this disclosure relate to the design and use of a FSP tool that friction stirs workpiece material more aggressively than conventional FSP tools. In some embodiments, one or more FSP tools described herein may efficiently friction stir workpiece material under lower axial loads than a conventional FSP tool.

In some embodiments, a FSP tool according to the present disclosure may include a radial protrusion with a working surface oriented in the rotational direction of the FSP tool. The working surface may be angled, tapered, curved, planar, or have other geometries to direct the flow of the workpiece material and/or circulate the workpiece material in the stirred zone during FSP.

Figure 1:
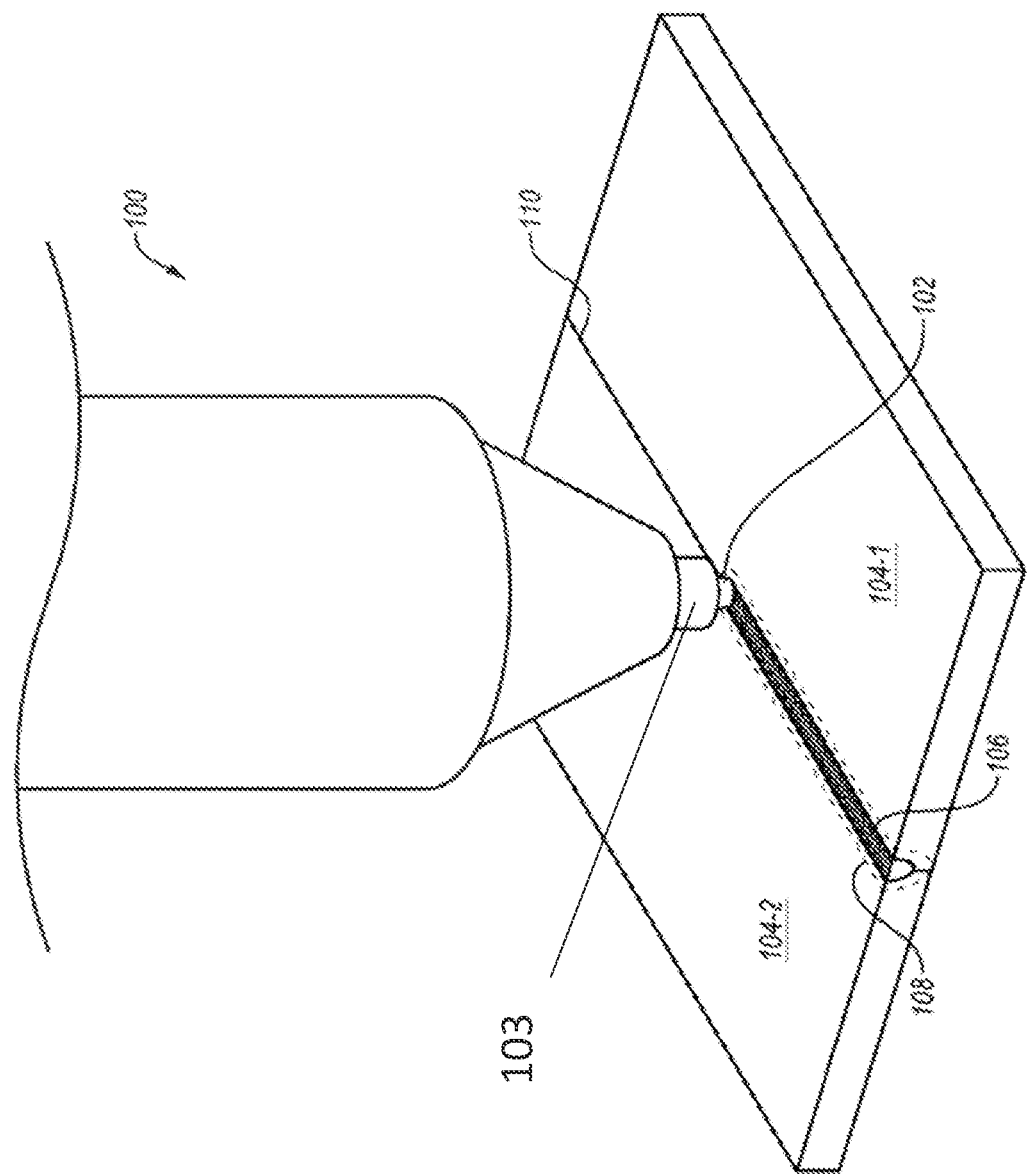
FIG. 1 is a perspective view of a friction stir processing (FSP) system, according to some embodiments of the present disclosure.

FIG. 1 illustrates an embodiment of a FSP system 100 with a FSP tool 102 and a tool head 103. The FSP tool 102 is in contact with a first workpiece 104-1 and a second workpiece 104-2. Rotation of the FSP tool 102 in contact with the workpieces 104-1, 104-2 may stir the workpieces 104-1, 104-2 in a stirred zone 106 and create a heat affected zone 108 beyond the stirred zone 106.

In some embodiments, FSP may refer to friction stir welding of a first workpiece to a second workpiece. For example, the first workpiece 104-1 may be positioned contacting the second workpiece 104-2 in a butt joint 110, and the first workpiece 104-1 and second workpiece 104-2 may be joined along the butt joint 110 by FSP. The FSP tool 102 may flow first workpiece material and second workpiece material in a circular direction and perpendicular to the butt joint 110 in the stirred zone 106 to transfer material between the first workpiece 104-1 and second workpiece 104-2, mechanically joining the first workpiece 104-1 and second workpiece 104-2 along the butt joint 110.

Stir welding is a solid state joining process that plastically moves material of the first workpiece 104-1 and second workpiece 104-2 to interlock the first workpiece 104-1 and second workpiece 104-2 at a microstructural level. In some embodiments, the first workpiece 104-1 and second workpiece 104-2 may be the same material. For example, the first workpiece 104-1 and the second workpiece 104-2 may be both a ferrous alloy. In other embodiments, the first workpiece 104-1 and second workpiece 104-2 may be different materials. For example, the first workpiece 104-1 may be a ferrous alloy, and the second workpiece 104-2 may be a titanium alloy.

In other embodiments, FSP may refer to the stirring of a workpiece 104-1, 104-2 to refine the grain structure in the stirred zone 106 and/or the heat affected zone 108 of the workpiece material. For example, the crystalline structure of the workpiece material may be at least partially dependent on the manufacturing of the workpiece. The as-manufactured grain structure may be undesirable for a finished part.

In some examples, a cast workpiece may have a random orientation (i.e., little or no texture) with a relatively large grain size with little to no deformation within each grain. FSP of the cast aluminum may refine the grain size to produce a smaller average grain size (increasing the boundary density of the microstructure). FSP of the cast aluminum may further produce internal strain within the grains. Increases in one or both of the grain boundary density and the internal strain may increase the hardness of the aluminum.

In other examples, an extruded or rolled workpiece may exhibit a desirable orientation to the grain structure (e.g., a <101> texture or a <001> texture, respectively, in aluminum) that may be undesirable in the finished part. For example, an extruded texture in an aluminum rod may increase the mechanical wear rate of the aluminum when used as an axle. FSP of the aluminum may mechanically alter the grain structure of the aluminum rod and/or remove the extruded texture of the rod surface. Orientation textures may affect other mechanical or chemical properties of the workpiece, such as anisotropic hardness or toughness, or oxidation rates.

In yet another embodiment, stir welding by FSP may include friction stirring of a first workpiece 104-1 and a second workpiece 104-2 adjacent one another in a lap joint with the first workpiece 104-1 overlapping a surface of the second workpiece 104-2. The FSP tool 102 may be positioned contacting a surface of the first workpiece 104-1 and the FSP tool 102 may be plunged into the first workpiece 104-1 and, optionally, the second workpiece 104-2 to plastically move first workpiece material and second workpiece material to interlock the first workpiece 104-1 and the second workpiece 104-2 at the lap joint.

Figure 2:
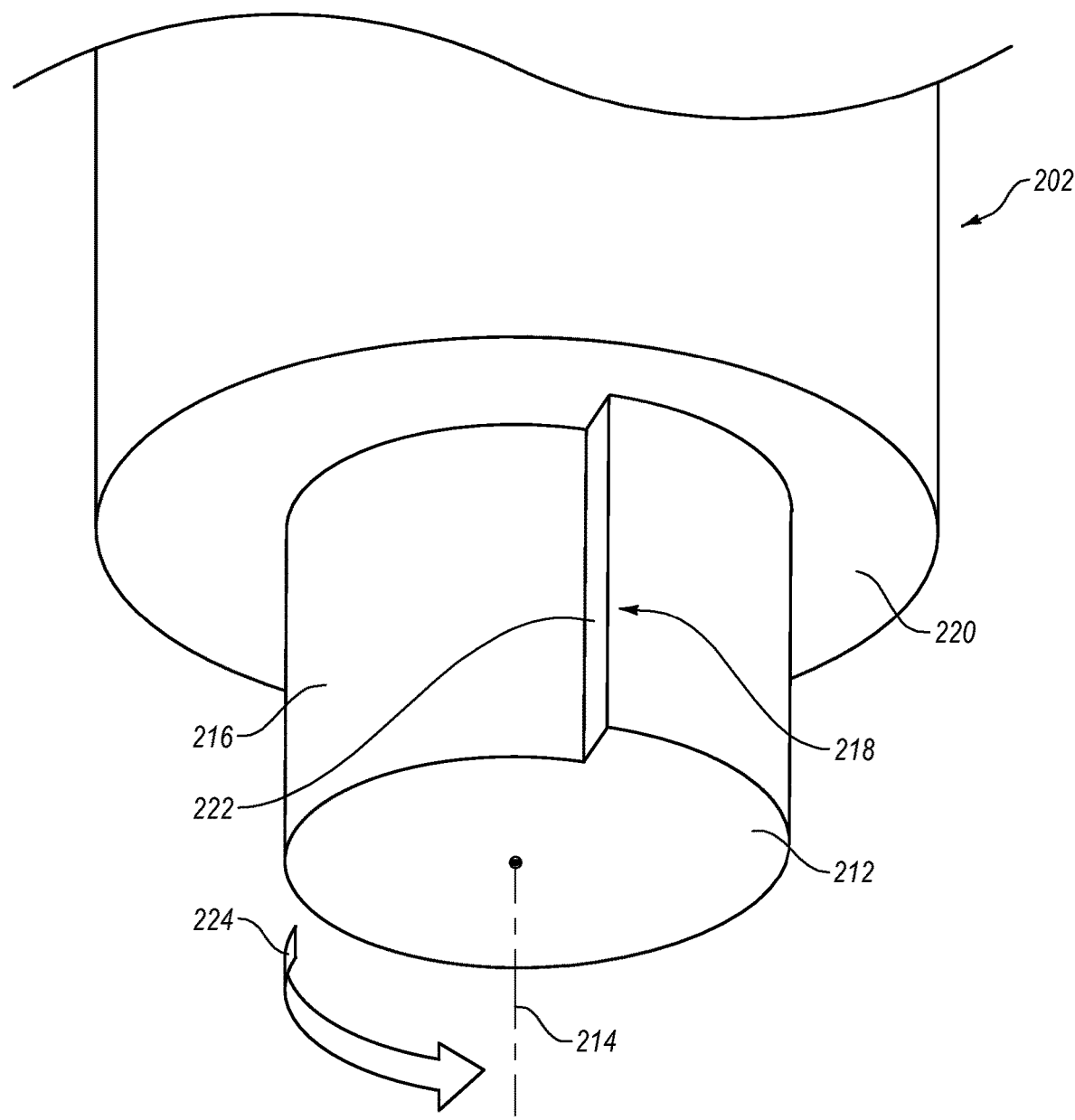
FIG. 2 is a bottom perspective view of a FSP tool, according to some embodiments of the present disclosure.

FIG. 2 is a bottom perspective view of an embodiment of a FSP tool 202 according to the present disclosure. In some embodiments, a FSP tool 202 may have a pin 212 that is rotatable about a rotational axis 214. The pin 212 may have a pin body 216 and a radial protrusion 218 in a perpendicular direction to the rotational axis 214 protruding from the pin body 216. In some embodiments, the pin 212 may be connected to a shoulder 220 of the FSP tool 202. In other embodiments, the FSP tool 202 may have a pin 212 without a shoulder 220.

In some embodiments, the radial protrusion 218 may have a working surface 222 orientated at least partially in the rotational direction 224 of the FSP tool 202. For example, the FSP tool 202 may rotate in the direction of the working surface 222 such that the working surface 222 engages with the workpiece material and applies a compression force to the workpiece material. The radial protrusion 218 and/or working surface 222 may engage with and move a greater amount of workpiece material than a conventional FSP tool that frictionally engages with the workpiece material as the FSP tool 202 rotates. Because a conventional FSP tool relies upon friction to move workpiece material, the force created to move workpiece material by a conventional FSP tool may require higher axial loads than an embodiment of an FSP tool 202 with a radial protrusion 218 and/or working surface 222 according to the present disclosure. In other words, an embodiment of a FSP tool 202 according to the present disclosure may move the same or more workpiece material with lesser axial loads than a conventional FSP tool by converting torque about the rotational axis 214 to a mechanical, compressive force against the workpiece material.

In some embodiments, the FSP tool 202 and/or pin 212 may include an ultrahard material. As used herein, the term "ultrahard" is understood to refer to those materials known in the art to have a grain hardness of about 1,500 HV (Vickers hardness in kg/mm2) or greater. Such ultra-hard materials can include those capable of demonstrating physical stability at temperatures above about 750° C., and for certain applications above about 1,000° C., that are formed from consolidated materials. Such ultrahard materials can include but are not limited to diamond or polycrystalline diamond (PCD), nanopolycrystalline diamond (NPD), or hexagonal diamond (Lonsdaleite); cubic boron nitride (cBN); polycrystalline cBN (PcBN); Q-carbon; binderless PcBN; diamond-like carbon; boron suboxide; aluminum manganese boride; metal borides; boron carbon nitride; and other materials in the boron-nitrogen-carbon-oxygen system which have shown hardness values above 1,500 HV, as well as combinations of the above materials. In at least one embodiment, a portion of the working surface 222 may be a monolithic carbonate PCD. For example, a portion of the working surface 222 may consist of a PCD without an attached substrate or metal catalyst phase. In some embodiments, the ultrahard material may have a hardness value above 3,000 HV. In other embodiments, the ultrahard material may have a hardness value above 4,000 HV. In yet other embodiments, the ultrahard material may have a hardness value greater than 80 HRa (Rockwell hardness A). In other embodiments, at least a portion of the working surface 222 may include a ferrous alloy, such as tool steel. In yet other embodiments, at least a portion of the working surface 222 may include a ceramic material.

Figure 3:
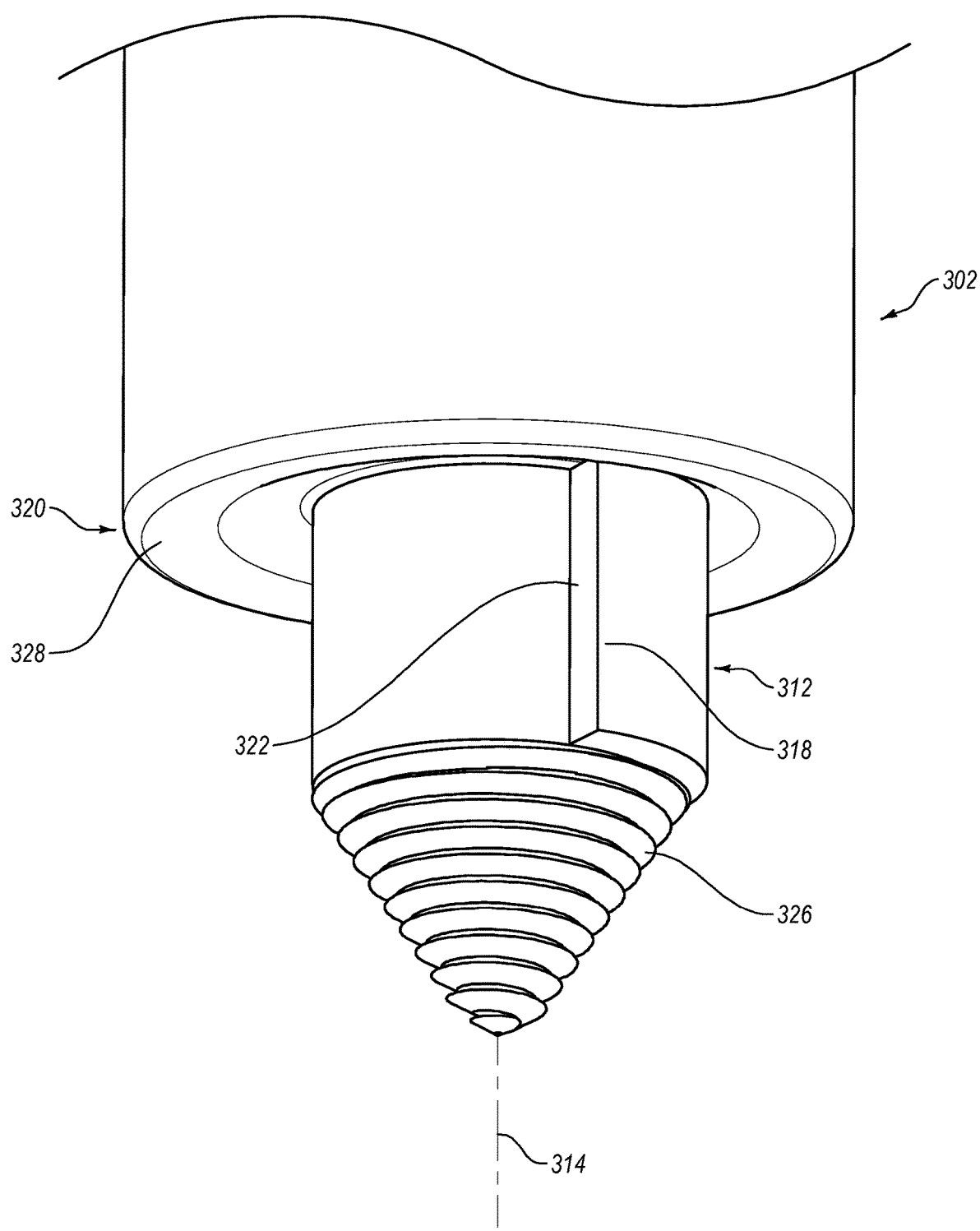
FIG. 3 is a bottom perspective view of another FSP tool, according to some embodiments of the present disclosure.

FIG. 3 is a bottom perspective view of another embodiment of an FSP tool 302 according to the present disclosure. In some embodiments, a FSP tool 302 may have one of more surface features that support flowing and/or circulating workpiece material toward the radial protrusion 318 and/or working surface 322 when the FSP tool 302 rotates about the rotational axis 314. In some embodiments, the surface feature may include threads 326 that flow workpiece material upward along the pin 312 toward the radial protrusion 318 and/or working surface 322 to allow the radial protrusion 318 to move the workpiece material. For example, the shoulder 320 of the FSP tool 302 may have a ridge 328 that limits the perpendicular movement of the workpiece material (e.g., the flash produced during rotation). The threads 326 may urge material upward, the working surface 322 may urge the workpiece material away from the pin 312, and the ridge 328 may urge the workpiece material downward into the stirred zone to circulate workpiece material.

In other embodiments, the surface feature may include threads 326 oriented in the opposite direction to the previous example, such that the threads 326 urge workpiece material longitudinally downward along the pin 312, forcing workpiece material to circulate within the stirred zone. Such circulation may promote homogenous microstructure in the resulting weld or processed material. In other embodiments, the surface feature may include grooves, slots, recesses, ridges, bumps, or other features to promote penetration into the workpiece, circulation of the workpiece material, translation of the FSP tool 302 across the workpiece, or combinations thereof.

Figure 4:
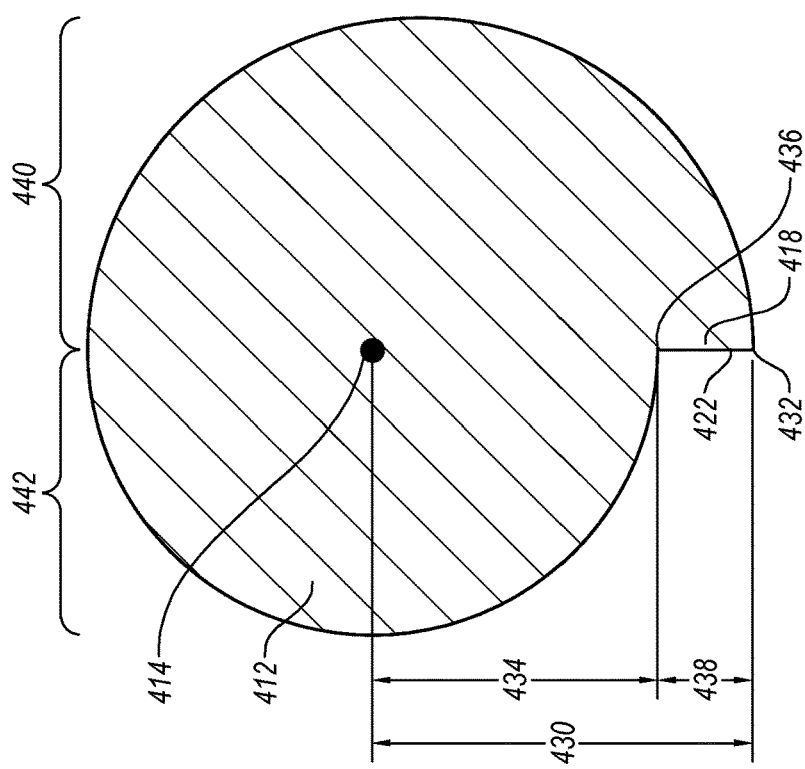
FIG. 4 is a cross-sectional end view of a pin of a FSP tool, according to some embodiments of the present disclosure.

In some embodiments, the radius of the pin may be continuously variable. In other embodiments, at least a portion of the pin may have a constant radius. FIG. 4 is a cross-sectional end view of an embodiment of a pin 412 perpendicular to the rotational axis 414 of the pin 412. In some embodiments, the pin 412 may have a first radius 430 at a working edge 432 of the radial protrusion 418. For example, the first radius 430 may be the maximum radius of the pin 412. In other examples, the first radius 430 may be less than the maximum radius of the pin 412, such as in a pin 412 with a plurality of radial protrusions or in a pin 412 with a radius that increases from the first radius 430 before the radius decreases below the first radius 430.

The pin 412 may have a second radius 434 at an inner edge 436 of the radial protrusion 418 that is less than the first radius 430. In some embodiments, a depth 438 of the radial protrusion 418 in the radial direction may be a percentage of the first radius 430. For example, the depth 438 (or depth 538 in FIG. 5) may be in a range having an upper value, a lower value, or upper and lower values including any of 1%, 2%, 5%, 10%, 15%, 20%, 25%, 30%, 35%, 40%, 45%, 50%, or any values therebetween of the first radius 430. In some examples, the depth 438, 538 may be greater than 1% of the first radius 430, 530. In other examples, the depth 438, 538 may be less than 50% of the first radius 430, 530. In yet other examples, the depth 438, 538 may be between 1% and 50% of the first radius 430, 530. In further examples, the depth 438, 538 may be between 2% and 45% of the first radius 430, 530. In yet further examples, the depth 438, 538 may be between 5% and 40% of the first radius 430, 530. In still further examples, the depth 438, 538 may be less than 10% or greater than 50% of the first radius 430, 530.

In some embodiments, the radius of the pin 412 may continuously decrease from the first radius 430 to the second radius 434. For example, the change in the radius may be linear with the angular position about the rotational axis 414. In other words, the decrease in radius from the first radius 430 to the second radius 434 may be constant around the rotational axis 414. In other examples, the decrease in radius from the first radius 430 to the second radius 434 may be non-linear, such as exponential or logarithmic.

Figure 5:
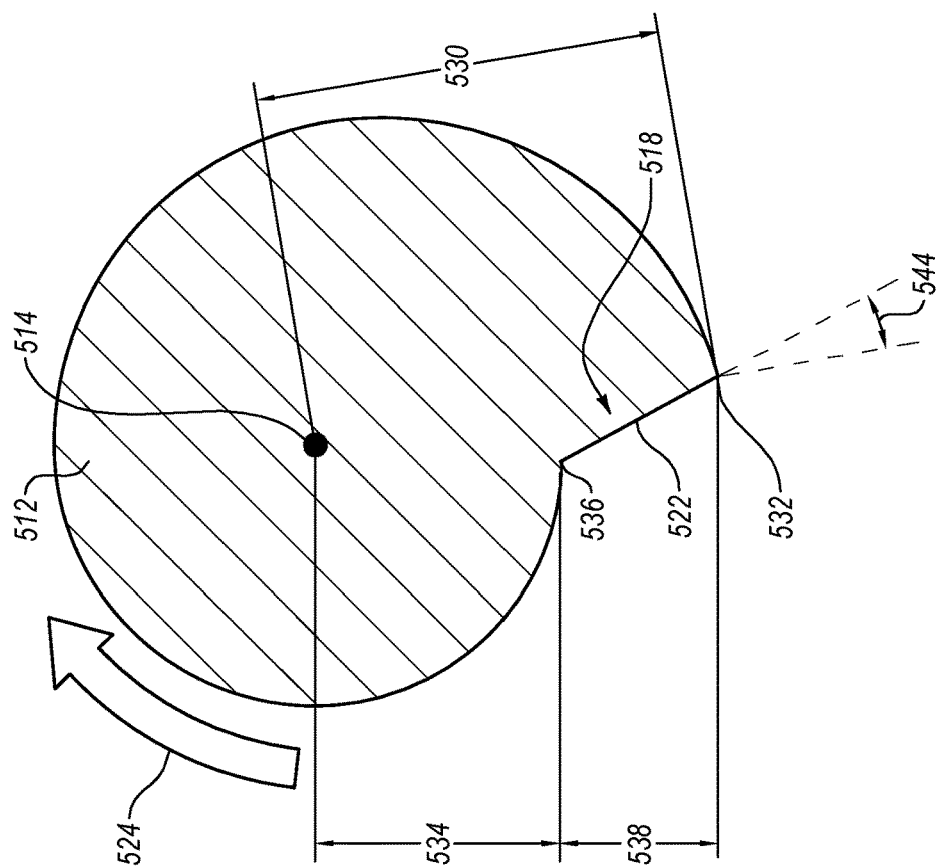
FIG. 5 is a cross-sectional end view of a pin of a FSP tool, according to some embodiments of the present disclosure.

FIG. 4 illustrates an embodiment of a pin 412 with a decreasing radius in a first portion 440 and a constant radius in a second portion 442. In some embodiments, the second portion 442 of the pin 412 with a constant radius may be approximately half of the pin 412 around the rotational axis 414. In other words, a 180° section of the pin 412 about the rotational axis 414 may be the second portion 442 with a constant radius. In other embodiments, the second portion 442 may be greater than 50% of the pin 412 or less than 50% of the pin 412. For example, the second portion 442 of the pin 412 with a constant radius may include a percentage of the pin 412 in a range having an upper value, a lower value, or upper and lower values including any of 1%, 5%, 10%, 20%, 30%, 40%, 50%, 60%, 70%, 80%, 90%, or any values therebetween. In some examples, the second portion 442 of the pin 412 may be greater than 1% of the pin 412 around the rotational axis 414. In other examples, the second portion 442 may be less than 90% of the pin 412 around the rotational axis 414. In yet other examples, the second portion 442 may be between 1% and 90%. In further examples, the second portion 442 may be between 5% and 80%. In yet further examples, the second portion 442 may be between 10% and 75%. In at least one example, the pin 412 may have no second portion 442 and the radius may continuously decrease around the rotational axis 414 relative to radial protrusion 418. For example, the embodiment of a pin 512 illustrated in FIG. 5 shows a continuously decreasing radius from a first radius 530 at a working edge 532 of a working surface 522 to a second radius 534 at an inner edge 536 of the working surface 522.

While FIG. 4 illustrates an embodiment of a radial protrusion 418 with a working surface 422 that is oriented in the radial direction (i.e., parallel to the radial direction) from the rotational axis 414, other embodiments may have a working surface that is angled relative to the radial direction. FIG. 5 is a cross-sectional end view of another embodiment of a pin 512 perpendicular to the rotational axis 514 of the pin 512. In some embodiments, the working surface 522 may be non-perpendicular to the rotational direction 524 of the pin 512. At least a portion of the working surface 522 may be oriented at radial working surface angle 544 relative to the radial direction. The radial working surface angle 544 may be angled toward or away (as illustrated in the embodiment in FIG. 5) from the rotational direction 524. In some embodiments, the radial working surface angle 544 may be in a range having an upper value, a lower value, or upper and lower values including any of 1°, 5°, 10°, 20°, 30°, 40°, 50°, 60°, or any values therebetween in either direction relative to the radial direction. For example, the radial working surface angle 544 may be greater than 1°. In other examples, the radial working surface angle 544 may be less than 60°. In yet other examples, the radial working surface angle 544 may be between 1° and 60°. In further examples, the radial working surface angle 544 may be between 5° and 50°. In yet further examples, the radial working surface angle 544 may be less than 45°.

In some embodiments, a pin 512 with a radial protrusion 518 may be a monolithic pin. For example, the pin 512 may be formed from a single piece of material. The radial protrusion 518 may be formed during casting or forging of the pin 512. In other examples, the radial protrusion 518 may be formed by removing (i.e., machining, cutting, abrading, etc.) material from the pin 512 after casting or forging of a blank. In yet other examples, the radial protrusion 518 may be formed when the pin material is in a green state before final hardening and/or sintering of the pin material. In a particular example, the pin material may include a tungsten carbide. A tungsten carbide powder may be formed and pressed into a blank in a green state, and the radial protrusion may be formed in the blank in a green state. The green state tungsten carbide may be subsequently exposed to elevated temperature and pressures to sinter and/or harden the tungsten carbide and produce the finished (or near finished) tungsten carbide pin.

Figure 6:
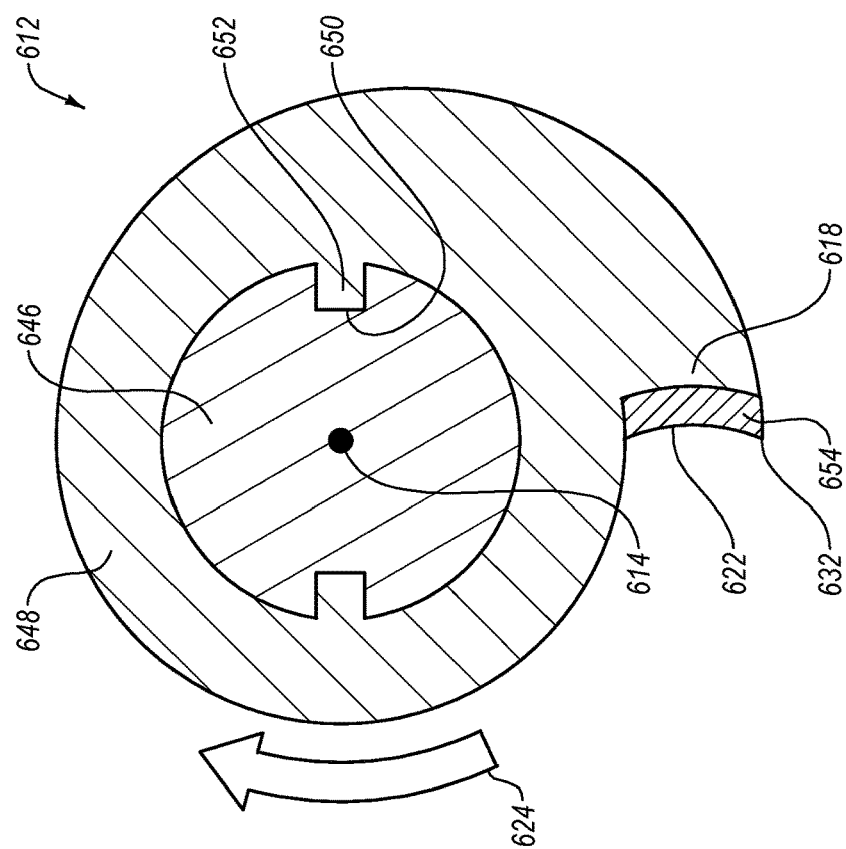
FIG. 6 is a cross-sectional end view of yet another pin of a FSP tool, according to some embodiments of the present disclosure.

In other embodiments, a pin may be formed of a plurality of parts, such as a pin core and a pin sleeve. FIG. 6 is a cross-sectional end view of an embodiment of a multi-element pin 612 perpendicular to the rotational axis 614 of the pin 612. For example, the pin core 646 and pin sleeve 648 may be different materials. The pin core 646 may include a core material and the pin sleeve 648 may include a sleeve material. In some embodiments, the core material may have a toughness greater than the toughness of the sleeve material, and the sleeve material may have a hardness greater than a hardness of the core material. The sleeve material may, thereby, provide increased wear resistance for the pin relative to the core material, while the toughness of the core material may provide increased fatigue resistance for the pin 612 relative to the sleeve material. In other examples, the pin core 646 and pin sleeve 648 may be the same material, and the pin core 646 and the pin sleeve 648 may be formed separately and assembled into the pin 612. In some embodiments, the pin sleeve 648 may be removable and/or replaceable. For example, the radial protrusion 618 of a pin 612 according to the present disclosure may experience greater wear and/or greater risk of failure than other portions of the pin 612 or FSP tool. A selectively replaceable pin sleeve 648 may allow for a FSP tool to have a longer operational lifetime by replacing a worn pin sleeve 648 or radial protrusion 618.

In some embodiments, the pin core 646 and pin sleeve 648 may be rotationally fixed relative to one another. For example, the pin core 646 and pin sleeve 648 may be coupled by a mechanical interlock, such as the interlocking recess 650 and protrusion 652 of the embodiment of FIG. 6; an adhesive; a braze; a weld; a mechanical fastener, such as a pin, bolt, clip, clamp, etc.; or combinations thereof. In other embodiments, the pin core 646 and pin sleeve 648 may be longitudinally moveable relative to one another. For example, a recess 650 and protrusion 652, such as shown in FIG. 6, may provide a mechanical interlock in the rotation direction and allow movement in the longitudinal direction. In at least one example, a recess 650 and protrusion 652 may frictionally engage to limit movement in the longitudinal direction and still allow the pin sleeve 648 to be replaceable. For example, the pin sleeve 648 may frictionally engage with the pin core 646 and resist longitudinal movement up to a threshold force. In some embodiments, the threshold force may be greater than 5 kilonewtons (kN), greater than 10 kN, greater than 20 kN, or greater than 50 kN.

Some embodiments of a pin 612, according to the present disclosure, may have a working surface layer 654 positioned on at least a portion of the working surface 622 to reduce wear and/or increase the operational lifetime of the working surface 622 of the radial protrusion 618. For example, the working surface layer 654 may have an increased wear resistance and/or lower coefficient of friction relative to a sleeve material (or pin body material in a monolithic construction). For example, the working surface layer 654 may include an ultrahard material. The working surface layer 654 may experience greater amounts of erosion, impact, or other wear forces relative to the rest of the pin 612. A working surface layer 654 having an increased wear resistance relative to the remainder of the pin 612 may allow for a longer operation lifetime of the pin 612. In at least one embodiment, the working surface layer 654 may be replaceable, allowing a worn, fractured, or otherwise damaged working surface 622 and/or working edge 632 to be replaced or repaired and extending the operational lifetime of the FSP tool.

In some embodiments, the working surface may be planar in lateral cross-section (i.e., perpendicular to the rotational axis), such as the embodiments shown in FIG. 2 through FIG. 5. In other embodiments, at least a portion of the working surface may be curved or otherwise non-planar in lateral cross-section. For example, at least a portion of the working surface 622 may be concave relative to the rotational direction 624, such as the embodiment shown in FIG. 6. In other examples, at least a portion of the working surface 622 may be convex relative to the rotational direction 624. In yet other examples, at least a portion of the working surface 622 may be discontinuous and have one or more surface features, such as ridges, grooves, slots, recesses, or combinations thereof. A concave working surface 622 may flow workpiece material more aggressively and/or direct the workpiece material longitudinally with less displacement of the workpiece material perpendicular to the rotational axis 614 of the pin 612. A convex working surface 622 may produce a shallower stirred zone, which may be beneficial in sheet workpieces, and/or reduce wear on a working edge 632 by increasing the radius of curvature of the working edge 632.

Figure 7:
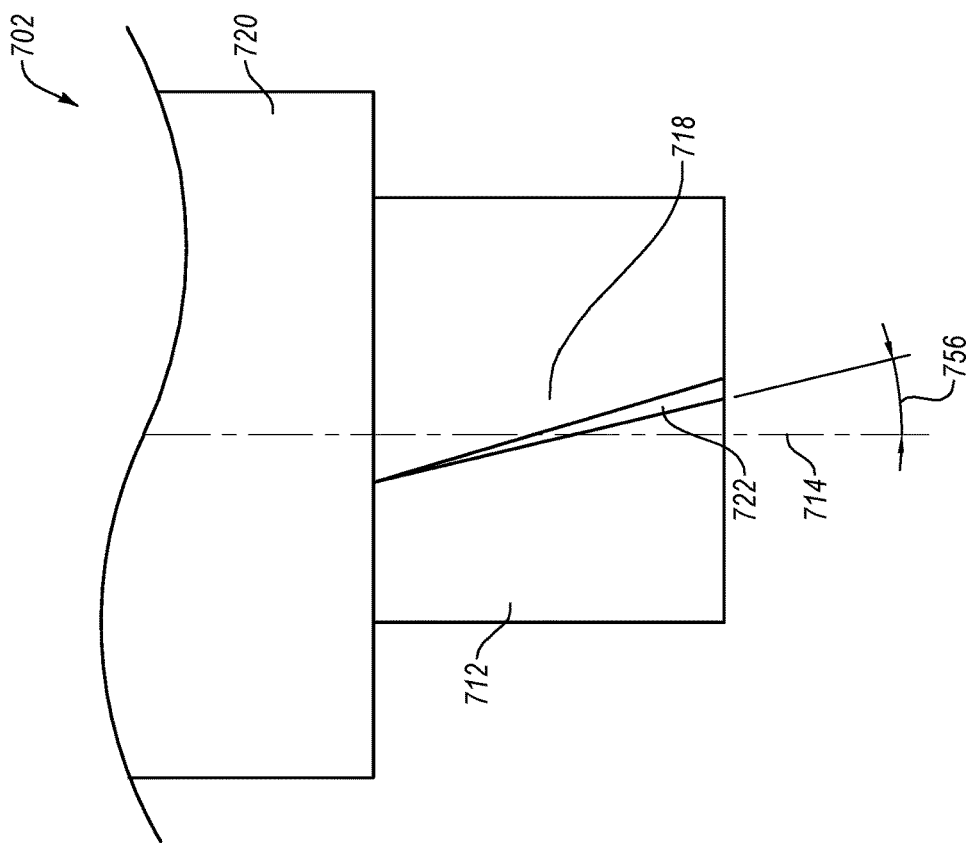
FIG. 7 is a side view of a pin of a FSP tool with an angled working surface, according to some embodiments of the present disclosure.

FIG. 7 is a side view of another embodiment of a pin 712 having a radial protrusion 718, according to the present disclosure. In some embodiments, at least a portion of the radial protrusion 718 may be slanted and/or curved in the longitudinal direction. For example, the working surface 722 of the radial protrusion 718 may be oriented at an angle to the rotational axis 714 in the longitudinal direction. In other words, at least a portion of the working surface 722 may be oriented downward in the longitudinal direction from the shoulder 720 of the FSP tool 702 or upward in the longitudinal direction toward the shoulder 720 of the FSP tool 702. The angle of the working surface 722 in the longitudinal direction may form a longitudinal working surface angle 756 relative to the longitudinal direction. In some embodiments, the longitudinal working surface angle 756 may be in a range having an upper value, a lower value, or upper and lower values including any of 1°, 5°, 10°, 20°, 30°, 40°, 50°, 60°, or any values therebetween in either direction relative to the longitudinal direction. For example, the longitudinal working surface angle 756 may be greater than 1°. In other examples, the longitudinal working surface angle 756 may be less than 60°. In yet other examples, the longitudinal working surface angle 756 may be between 1° and 60°. In further examples, the longitudinal working surface angle 756 may be between 5° and 50°. In yet further examples, the longitudinal working surface angle 756 may be less than 45°.

Figure 8:
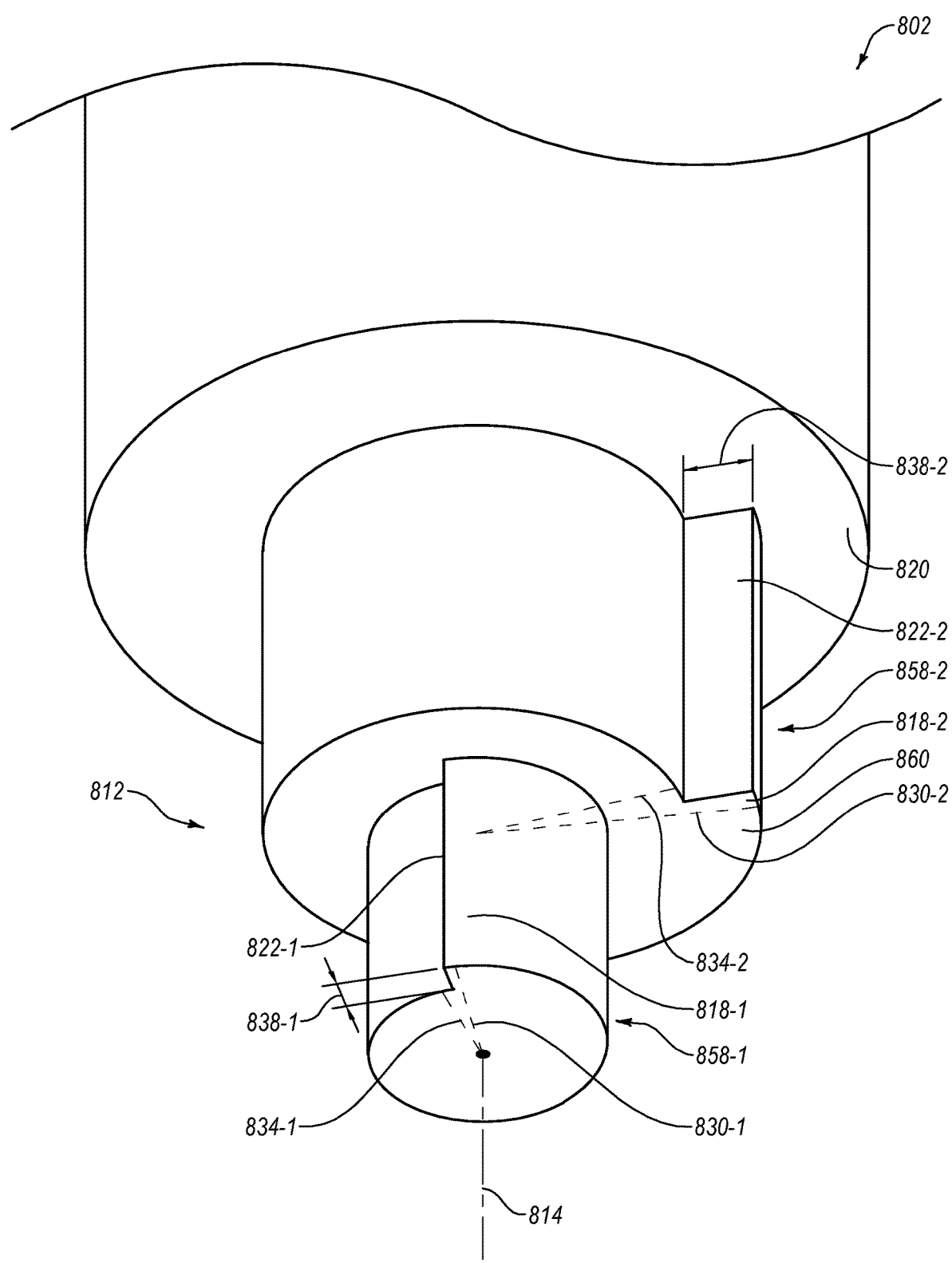
FIG. 8 is a bottom perspective view of a tapered pin of a FSP tool, according to some embodiments of the present disclosure.

FIG. 8 is a bottom perspective view of another embodiment of a pin 812 and FSP tool 802 according to the present disclosure. In some embodiments of a FSP tool 802, the pin 812 may taper. In some embodiments, the sides of the pin may be angled, such that the pin is conical or frustoconical. In other examples, the pin 812 may have a plurality of tiers 858-1, 858-2 or sections separated by a longitudinally oriented intermediate surface 860. In some embodiments, each of the tiers 858-1, 858-2 may have a radial protrusion 818-1, 818-2 according to the present disclosure. In other embodiments, less than all tiers 858-1, 858-2 may have a radial protrusion 818-1, 818-2. For example, a pin 812 may have a bottommost first tier 858-1 (i.e., furthest from a shoulder 820) with a radial protrusion, while a second tier 858-2 nearer a shoulder 820 of the FSP tool 802 may lack a radial protrusion. In other examples, a pin 812 may have a second tier 858-2 with a radial protrusion 818-2, while a bottommost first tier 858-1 may lack a radial protrusion. While FIG. 8 illustrates an embodiment of a tiered pin 812 with two tiers 858-1, 858-2, other quantities of tiers are contemplated by the present disclosure, including 3, 4, 5, 6, 7, 8, or more tiers with intermediate surfaces therebetween.

In some embodiments, a first radius 830-1 of the first tier 858-1 may be related to a first radius 830-2 of the second tier 858-2. A radius ratio (i.e., the first radius 830-1 of the first tier 858-1 to the first radius 830-2 of the second tier 858-2) of the first tier 858-1 and second tier 858-2 may be in a range having an upper value, a lower value, or upper and lower values including any of 0.30, 0.50, 0.60, 0.65, 0.70, 0.75, 0.80, 0.85, 0.90, 0.95, 0.98, 0.99, or any values therebetween. In some examples, the radius ratio may be greater than 0.30. In other examples, the radius ratio may be less than 0.99. In yet other examples, the radius ratio may be between 0.30 and 0.99. In further examples, the radius ratio may be between 0.50 and 0.90. In at least one example, the radius ratio may be 0.66.

In other embodiments, a first tier 858-1 may have a first radius 830-1 and a second radius 834-1 where the first radius 830-1 of the first tier 858-1 may be related to a second radius 834-2 of the second tier 858-2. A secondary radius ratio (i.e., the first radius 830-1 of the first tier 858-1 to the second radius 834-2 of the second tier 858-2) of the first tier 858-1 and second tier 858-2 may be in a range having an upper value, a lower value, or upper and lower values including any of 0.30, 0.50, 0.60, 0.70, 0.80, 0.90, 1.0, 1.1, 1.2, 1.3, or any values therebetween. In some examples, the secondary radius ratio may be greater than 0.30. In other examples, the secondary radius ratio may be less than 1.3. In yet other examples, the secondary radius ratio may be between 0.30 and 1.3. In further examples, the secondary radius ratio may be between 0.50 and 1.0. In at least one example, the secondary radius ratio may be 0.80. In at least one other example, the secondary radius ratio may be 1.0. In other words, the first radius 830-1 (largest radius) of the first tier 858-1 may be equivalent to the second radius 834-2 (smallest radius) of the second tier 858-2. In some embodiments, a secondary radius ratio of 1.0 may allow more efficient flow of workpiece material between tiers 858-1, 858-2 of the pin 812.

In some embodiments, the first radial protrusion 818-1 and the second radial protrusion 818-2 may be rotationally oriented relative to one another. For example, the embodiment illustrated in FIG. 8 shows the first radial protrusion 818-1 and the second radial protrusion 818-2 oriented at a 90° angle about the rotational axis 814 relative to one another. In other examples, the first radial protrusion 818-1 and the second radial protrusion 818-2 may be oriented radially opposite one another (i.e., the first working surface 822-1 and second working surface 822-2 are 180° from one another around the rotational axis 814). In some embodiments, radially opposing first and second radial protrusions 818-1, 818-2 may balance torque and/or lateral forces on the pin 812 during FSP. In yet other examples, the first radial protrusion 818-1 and second radial protrusion 818-2 may be rotationally aligned about the rotational axis 814 (i.e., the first working surface 822-1 and second working surface 822-2 are positioned at the same rotational position 0° from one another around the rotational axis 814). In some embodiments, radially aligning the first and second radial protrusions 818-1. 818-2 may improve workpiece material flow between tiers 858-1, 858-2 of the pin 812 during FSP. In other embodiments, the first radial protrusion 818-1 and second radial protrusion 818-2 may be oriented at any angle between 0° and 360° about the rotational axis 814.

In some embodiments, the first radial protrusion depth 838-1 and the second radial protrusion depth 838-2 may be related to one another by a depth ratio. The depth ratio (first radial protrusion depth 838-1 to second radial protrusion depth 838-2) may be in a range having an upper value, a lower value, or upper and lower values including any of 0.30, 0.50, 0.60, 0.70, 0.80, 0.90, 1.0, 1.1, 1.2, 1.3, 1.4, 1.5, 1.7, or any values therebetween. In some examples, the depth ratio may be greater than 0.30. In other examples, the depth ratio may be less than 1.7. In yet other examples, the depth ratio may be between 0.30 and 1.7. In further examples, the depth ratio may be between 0.50 and 1.5. In at least one example, the depth ratio may be 1.0.

Figure 9:
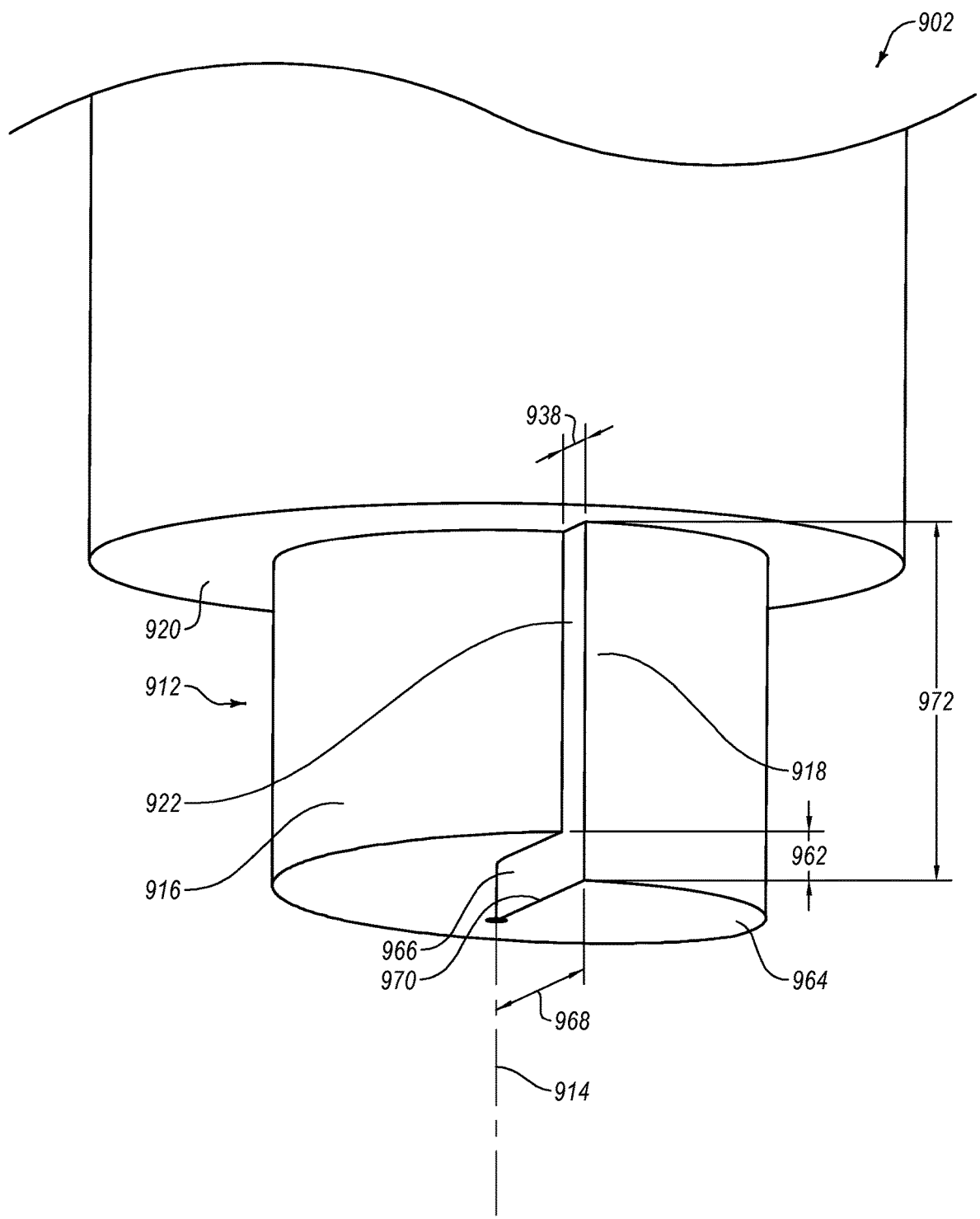
FIG. 9 is a bottom perspective view of still another pin of a FSP tool, according to some embodiments of the present disclosure.

FIG. 9 is a bottom perspective view of an embodiment of a pin 912 with a radial protrusion 918 that also protrudes longitudinally from the pin body 916. The radial protrusion 918 may protrude a protrusion height 962 from the pin body 916 in the longitudinal direction of the rotational axis 914. The protrusion height 962 is the distance the working surface 922 of the radial protrusion 918 extends longitudinally beyond the longitudinally-furthest (i.e., furthest upward from the downward-most point of the working surface 922) on the end surface 964. In some embodiments, the protrusion height 962 of the radial protrusion 918 beyond another portion of the end surface 964 may provide a working surface 922 with a leading portion 966 at a distal end (i.e., the end of the pin 912 furthest from the shoulder 920) that continues radially toward the rotational axis 914 beyond the depth 938 of the radial protrusion 918. For example, the leading portion 966 may have a radial length 968 that is greater than the depth 938 of the radial protrusion 918. In at least one example, the radial length 968 of the leading portion 966 may be the first radius of the radial protrusion 918. In at least one embodiment, a leading edge 970 of the leading portion 966 may be a cutting feature that allows for removal of workpiece material as the FSP tool 902 enters a workpiece.

In some embodiments, the protrusion height 962 may be related to the pin height 972. For example, the height ratio (i.e., the protrusion height 962 to pin height 972) may be in a range having an upper value, a lower value, or upper and lower values including any of 0.01, 0.05, 0.10, 0.15, 0.20, 0.25, 0.30, 0.35, 0.40, 0.45, 0.50, or any values therebetween. In some examples, the height ratio may be greater than 0.01. In other examples, the height ratio may be less than 0.50. In yet other examples, the height ratio may be between 0.01 and 0.50. In further examples, the height ratio may be between 0.05 and 0.40. In at least one example, the height ratio may be 0.10.

Figure 10:
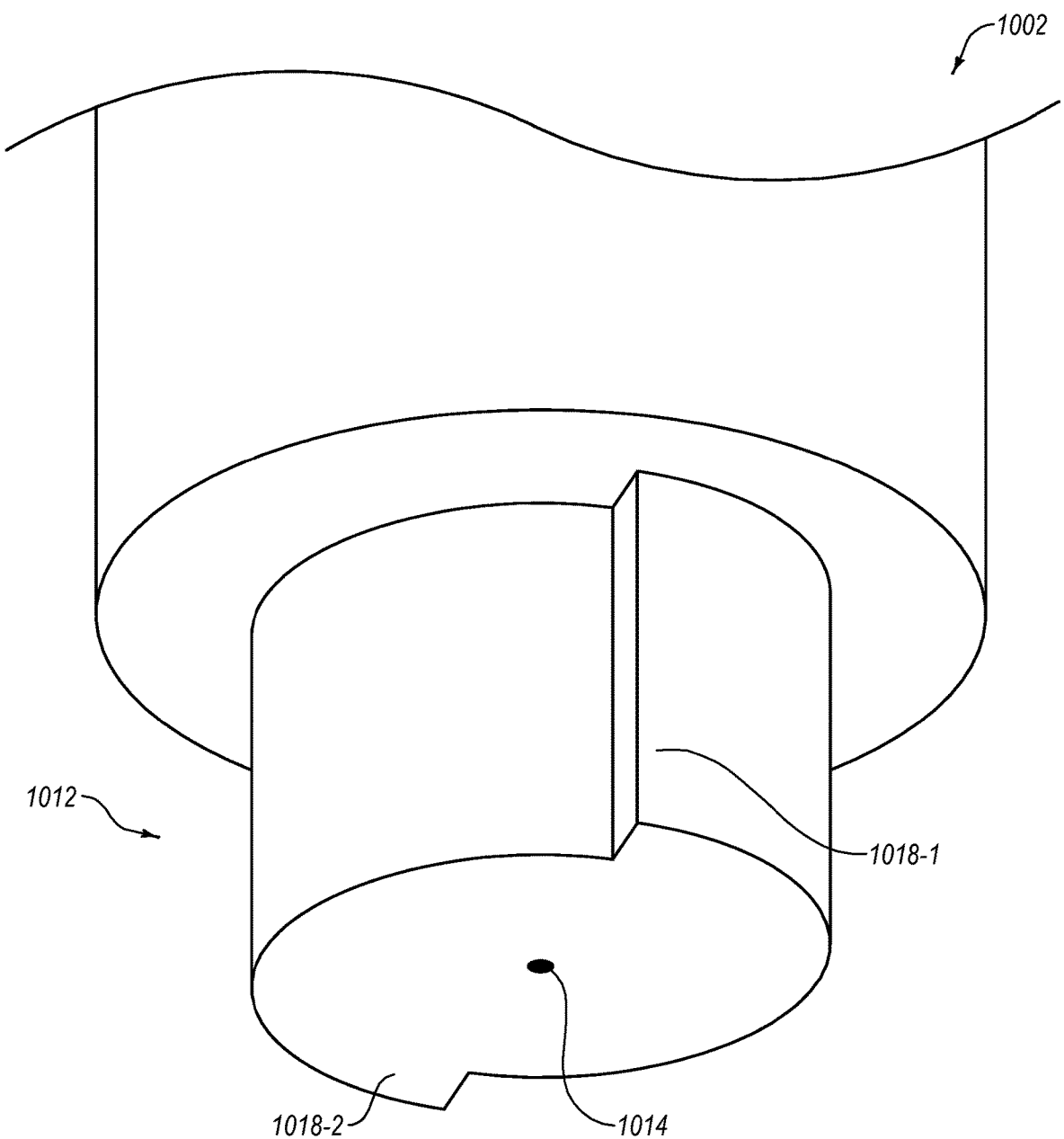
FIG. 10 is a bottom perspective view of a further pin of a FSP tool, according to some embodiments of the present disclosure.

FIG. 10 is a bottom perspective view of an embodiment of a pin 1012 with a plurality of radial protrusions 1018-1, 1018-2. In some embodiments, a plurality of radial protrusions 1018-1, 1018-2 may balance torque on a pin. In other embodiments, a plurality of radial protrusions 1018-1, 1018-2 may increase workpiece material flow during FSP operations. In some embodiments, the plurality of radial protrusions 1018-1, 1018-2 may be positioned about the rotational axis 1014 at equal angular intervals. For example, the two radial protrusions 1018-1, 1018-2 of the embodiment in FIG. 10 are illustrated at equal 180° intervals from one another. In other examples, three radial protrusions may be positioned at equal 120° intervals or four radial protrusions may be positioned at equal 90° intervals. In other embodiments, the plurality of radial protrusions 1018-1, 1018-2 may be positioned about the rotational axis 1014 at unequal angular intervals. For example, three radial protrusions may be positioned at 110°, 120°, and 130° intervals.

A pin having a plurality of radial protrusions may be combined with other features described herein, such as the tiered or tapered embodiments described in relation to FIG. 8 or embodiments with a longitudinally extended leading portion described in relation to FIG. 9.

Figures 2, 11:
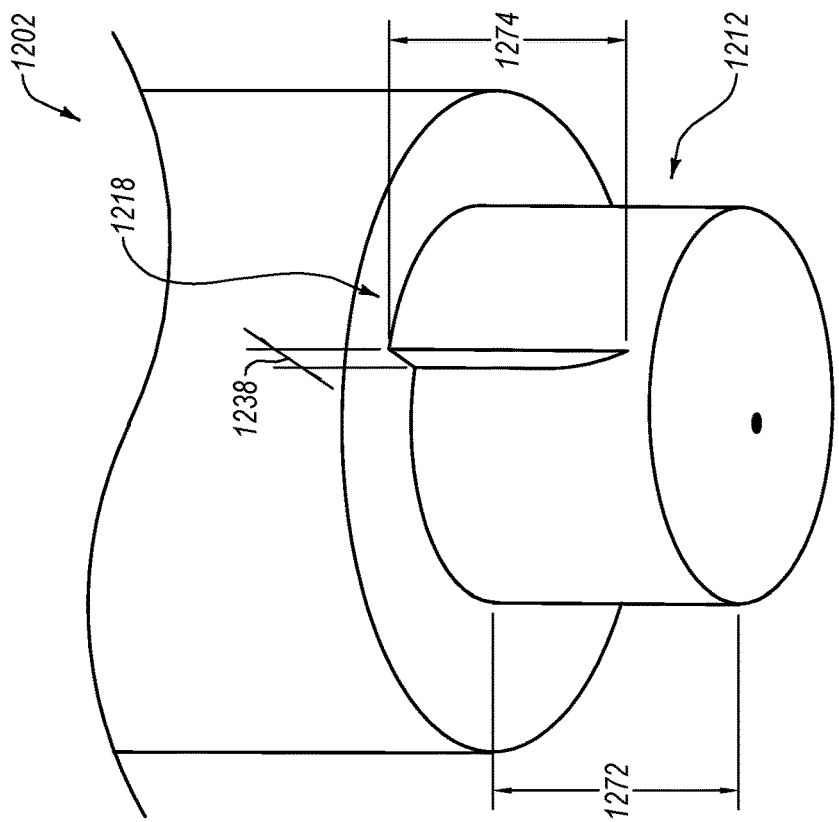
Figures 1, 11:
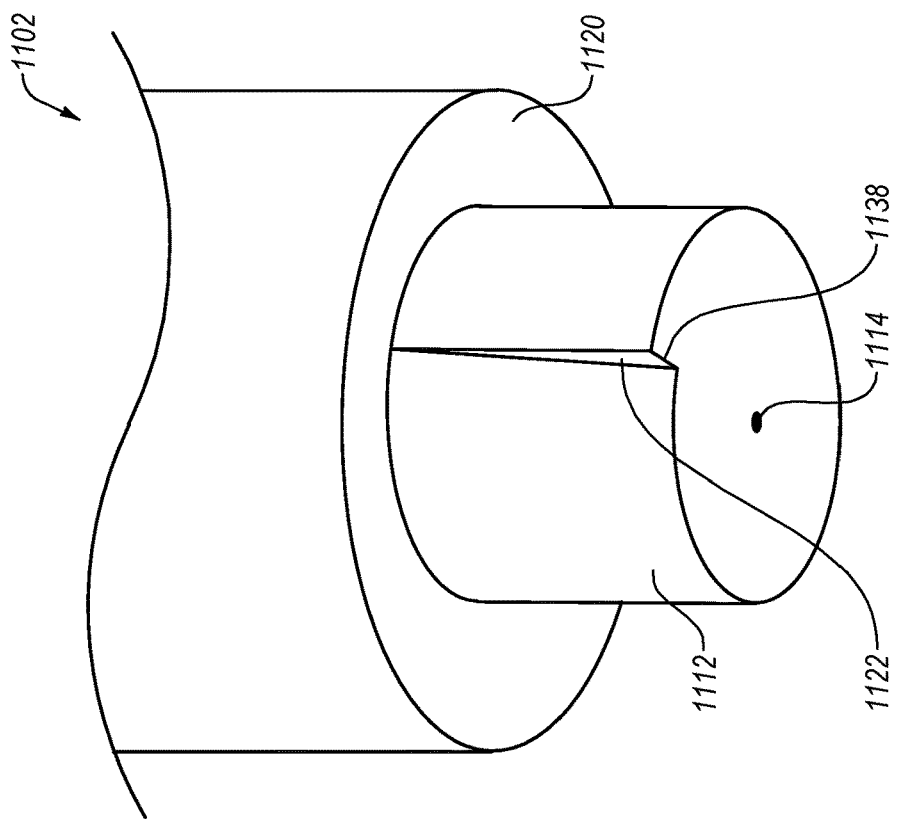

FIGS. 11-1 and 11-2 are bottom perspective views of other embodiments of a FSP tool having a radial protrusion with a depth that varies in the longitudinal direction. Such as shown in FIG. 11-1, in some embodiments, a working surface depth 1138 may taper in the longitudinal direction along the rotational axis 1114 of the pin 1112 toward the shoulder 1120 of the FSP tool 1102. In other embodiments, the depth 1138 may taper in the longitudinal direction away from the shoulder 1120. In some embodiments, the depth 1138 may change linearly with the longitudinal position on the pin 1112. In other embodiments, the depth 1138 of the working surface 1122 may change non-linearly (e.g., exponentially, discontinuously, stepped, or other non-linear relationships) with the longitudinal position on the pin 1112.

In yet other embodiments of an FSP tool 1202 having a pin 1212, such as the embodiment illustrated in FIG. 11-2, at least a portion of the radial protrusion 1218 may have a depth 1238 that is constant in the longitudinal direction. In further embodiments, the radial protrusion 1218 may have a length 1274 in the longitudinal direction less than a pin height 1272. For example, the radial protrusion 1218 may have a length 1274 in a range having an upper value, a lower value, or upper and lower values including any of 5%, 10%, 20%, 30%, 40%, 50%, 60%, 70%, 80%, 90%, or 100% of the pin height 1272. In some examples, the radial protrusion 1218 may have a length 1274 greater than 5% of the pin height 1272. In some examples, the radial protrusion 1218 may have a length 1274 less than 100% of the pin height 1272. In some examples, the radial protrusion 1218 may have a length 1274 between 5% and 95% of the pin height 1272. In some examples, the radial protrusion 1218 may have a length 1274 between 10% and 90% of the pin height 1272. In some examples, the radial protrusion 1218 may have a length 1274 50% of the pin height 1272.

Figure 12:
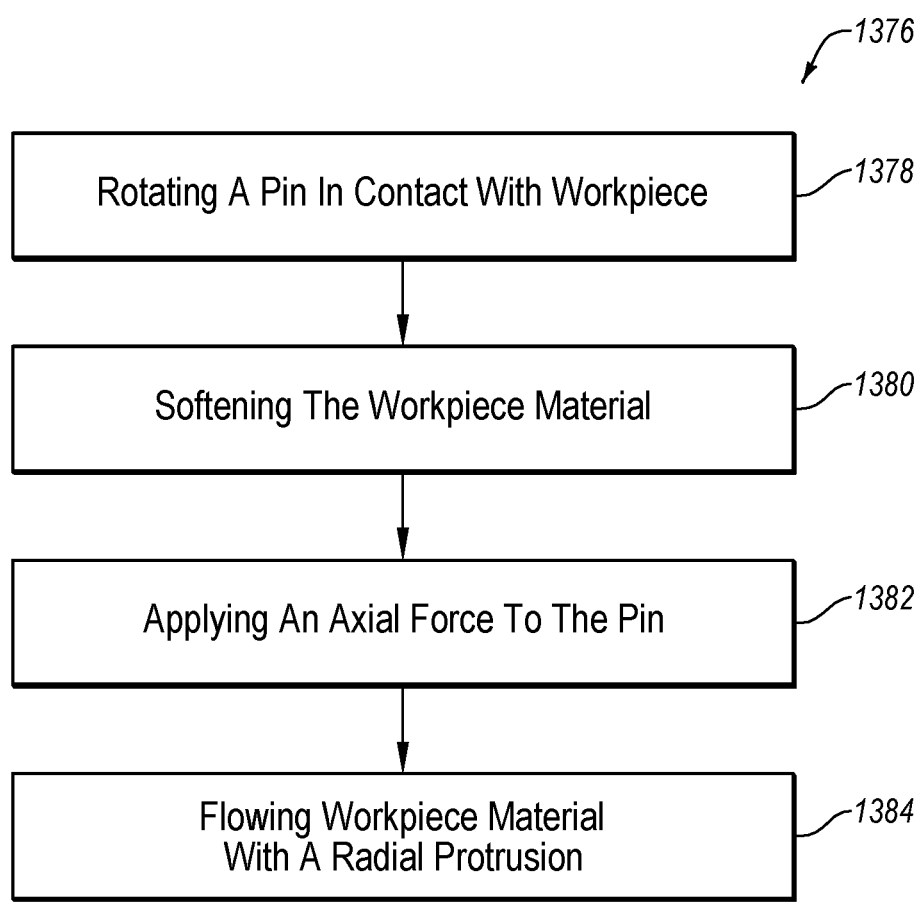
FIG. 12 is a flowchart of a method of friction stir processing, according to some embodiments of the present disclosure.

FIG. 12 is a flowchart illustrating an embodiment of a method 1376 of friction stir processing a workpiece, according to the present disclosure. In some embodiments, the method 1376 may include positioning a FSP tool according to the present disclosure in contact with a workpiece surface and rotating the pin while contacting the workpiece at 1378. The method may further include softening the workpiece material to plasticize the workpiece material without reaching the melting temperature of the workpiece material at 1380.

In some embodiments, the method may include applying an axial force in the longitudinal direction to urge the FSP tool into the workpiece at 1382. A FSP tool according to the present disclosure may flow workpiece material more aggressively than a conventional FSP tool by moving workpiece material with a working surface of a radial protrusion oriented in the rotational direction at 1384, allowing the use of higher torque loads on the FSP tool and lower axial loads than a conventional FSP tool. In some embodiments, the axial load used with a FSP tool of the present disclosure to generate an equivalent amount of heat in the workpiece and pin (compared to using a convention FSP tool) may be reduced by at least 50%. In other embodiments, the axial load may be reduced by at least 75%. In yet other embodiments, the axial load may be reduced by at least 90%. For example, during testing of an embodiment of an FPS tool with a radial protrusion according to the present disclosure, thermal energy was generated using 100 lbs (445 Newtons) of axial load equivalent to 2000 lbs (8.9 kN) of axial load with a conventional FSP tool.

In some embodiments, the method may further include circulating the softened workpiece material using a shoulder of the FSP tool. The radial protrusion may function as a paddle to engage and move the softened workpiece material. The displacement of the workpiece material as the radial protrusion moves through the workpiece material may urge the workpiece material toward the shoulder. The workpiece material may contact the shoulder and flow outward as additional workpiece material is urged toward the pin, resulting in a circulation of workpiece material.

In other embodiments, the method may further include directing the flow of workpiece material in the longitudinal direction using the radial protrusion. The radial protrusion may be sloped, curved, or otherwise have a longitudinal working surface angle that directs the workpiece material in an upward or downward longitudinal direction. In other examples, the radial protrusion may vary in depth along a longitudinal length of the pin, producing different rates of workpiece material flow at different longitudinal positions along the pin. The different rates of workpiece material flow may produce a longitudinal flow of the workpiece material along the pin of the FSP tool.

Figure 13:
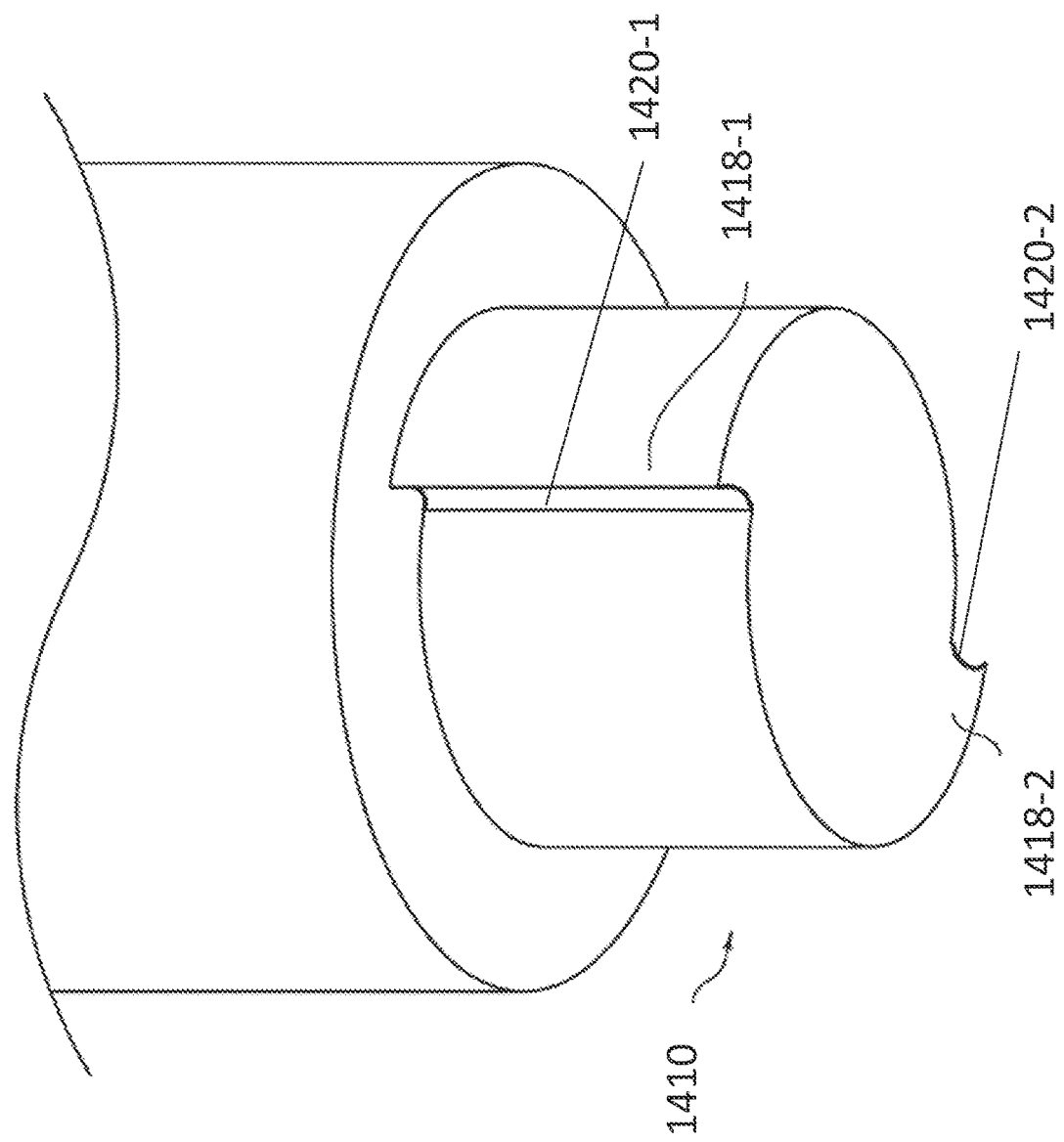
FIG. 13 is a bottom perspective view of a further pin of a FSP tool, according to some embodiments of the present disclosure.

FIG. 13 is a bottom perspective view of an embodiment of a pin 1410 with a plurality of radial protrusions 1418-1, 1418-2. The protrusions 1418-1 and 1418-2 have concave working surfaces 1420-1 and 1420-2.

In at least some embodiments, a FSP tool according to the present disclosure may flow more material with lower axial loads than a conventional FSP tool, allowing the use of the FSP tool on a broader installation base of equipment and systems.

One or more specific embodiments of the present disclosure are described herein. These described embodiments are examples of the presently disclosed techniques. Additionally, in an effort to provide a concise description of these embodiments, not all features of an actual embodiment may be described in the specification.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A method of friction-stir processing using a friction stirring processing (FSP) tool comprising:
a pin having a pin body and a rotational axis and being configured to rotate about the rotational axis in a rotational direction;
a radial protrusion protruding radially from the pin body, the radial protrusion having a radially inner edge, a radially outer working edge, and a working surface;
the radially inner edge having a first radius from the rotational axis and the radially outer working edge having a second radius from the rotational axis that is greater than the first radius;
a continuous, curved side surface of the pin body and the protrusion, the curved side surface extending around the rotational axis from the radially outer working edge to the radially inner edge of the radial protrusion;
the working surface projecting outward from the radially inner edge to the radially outer working edge and forming a corner juncture with the curved side surface at the radially outer working edge; and
the curved side surface has a radius from the rotational axis that decreases as the curved side surface extends around the rotational axis from the radially outer working edge to the radially inner edge, the method comprising:
rotating the pin of the FSP tool in contact with a workpiece including a workpiece material;
softening the workpiece material; and
flowing softened workpiece material with the working surface of the radial protrusion of the pin.

2. The method of claim 1, wherein the method further comprises the step of circulating the softened workpiece material with a shoulder of the FSP tool.

3. The method of claim 1, wherein the method further comprises the step of directing the softened workpiece material in a longitudinal direction with the radial protrusion.

4. A friction stirring processing (FSP) tool comprising:
a pin including a pin body and a rotational axis, the pin configured to rotate about the rotational axis in a rotational direction;
a radial protrusion protruding radially from the pin body, the radial protrusion having a radially inner edge, a radially outer working edge, and a working surface;
the radially inner edge having a first radius from the rotational axis and the radially outer working edge having a second radius from the rotational axis that is greater than the first radius;
a continuous, curved side surface of the pin body and the protrusion, the curved side surface extending around the rotational axis approximately 360 degrees from the radially outer working edge to the radially inner edge of the radial protrusion;
the working surface projecting outward from the radially inner edge to the radially outer working edge and forming a corner juncture with the curved side surface at the radially outer working edge; and
the curved side surface has a radius from the rotational axis that decreases as the curved side surface extends around the rotational axis approximately 360 degrees from the radially outer working edge to the radially inner edge.

5. The FSP tool of claim 4 wherein the working surface has a radial orientation relative to the axis of rotation.

6. The FSP tool of claim 4 wherein the working surface has a non-radial orientation relative to the axis of rotation.

7. The FSP tool of claim 4 wherein the pin is of an ultrahard material and has a unitary, one-piece construction.

8. A method friction-stir processing using the FSP tool of claim 4, the method comprising:
rotating the pin of the FSP tool in contact with a workpiece including a workpiece material;
softening the workpiece material; and
flowing softened workpiece material with the working surface of the radial protrusion of the pin.

9. A friction stirring processing (FSP) system comprising the FSP tool of claim 4 and a tool head that is configured to have the FSP tool connected thereto, the tool head operable to rotate the FSP tool about the rotational axis during a friction stirring operation.

10. A friction stirring processing (FSP) tool comprising:
a pin having a rotatable axis, the pin rotatable around the rotational axis in a rotational direction;

a pin body of the pin;
a plurality of protrusions of the pin protruding radially from the pin body about the pin body, each protrusion comprising:
a radially inner base having a first radius from the rotational axis;
a radially outer working edge having a second radius from the rotational axis greater than the first radius;
a concave working surface extending from the radially inner base to the radially outer edge;
a convex side surface extending around the rotational axis from the radially outer working edge of the protrusion toward the radially inner base of an adjacent one of the protrusions;
the concave working surface forming a corner juncture with the convex side surface at the radially outer working edge; and
the convex side surface has a radius from the rotational axis that decreases as the convex side surface extends around the rotational axis from the radially outer working edge of the protrusion toward the radially inner base of the adjacent one of the protrusions.

11. The FSP tool of claim 10 wherein the concave working surfaces of the protrusions have a non-radial orientation relative to the rotational axis.

12. The FSP tool of claim 10 wherein the concave working surfaces of the protrusions are at transverse orientations relative to a longitudinal direction of the rotational axis.

13. A method friction-stir processing using the FSP tool of claim 10, the method comprising:
rotating the pin of the FSP tool in contact with a workpiece including a workpiece material;
softening the workpiece material; and
flowing softened workpiece material with the working surface of the radial protrusion of the pin.

14. A friction stirring processing (FSP) system comprising the FSP tool of claim 10 and a tool head that is configured to have the FSP tool connected thereto, the tool head operable to rotate the FSP tool about the rotational axis during a friction stirring operation.

15. The FSP tool of claim 4 wherein the working surface is planar and has a radial orientation relative to the axis of rotation.

* * * * *